United States Patent
Das

(10) Patent No.: US 8,185,763 B2
(45) Date of Patent: May 22, 2012

(54) METHOD OF AND APPARATUS FOR INFORMING USER ABOUT SETTING STATE OF WAKE-ON-LAN FUNCTION

(75) Inventor: Kumarbrata Das, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 925 days.

(21) Appl. No.: 12/177,264

(22) Filed: Jul. 22, 2008

(65) Prior Publication Data

US 2009/0031124 A1 Jan. 29, 2009

(30) Foreign Application Priority Data

Jul. 25, 2007 (KR) .................................. 2007-74735

(51) Int. Cl.
*G06F 1/00* (2006.01)
(52) U.S. Cl. ......... 713/324; 713/100; 713/310; 713/320
(58) Field of Classification Search .................. 713/100, 713/300, 310, 320, 324
See application file for complete search history.

(56) References Cited

U.S. PATENT DOCUMENTS

| | | | | |
|---|---|---|---|---|
| 6,734,864 | B2 * | 5/2004 | Abgrall | 345/537 |
| 7,117,377 | B2 * | 10/2006 | Hagiwara et al. | 713/300 |
| 7,895,590 | B2 * | 2/2011 | Henderson et al. | 717/168 |
| 2002/0188838 | A1 * | 12/2002 | Welder | 713/2 |
| 2003/0135726 | A1 * | 7/2003 | Hagiwara et al. | 713/1 |
| 2005/0047356 | A1 * | 3/2005 | Fujii et al. | 370/311 |
| 2006/0053417 | A1 * | 3/2006 | Henderson et al. | 717/168 |
| 2006/0101292 | A1 * | 5/2006 | Hahn et al. | 713/300 |
| 2006/0117198 | A1 * | 6/2006 | Takasu | 713/323 |
| 2006/0161848 | A1 * | 7/2006 | Stabb et al. | 715/741 |
| 2007/0150766 | A1 * | 6/2007 | Kuwahara | 713/300 |
| 2008/0005423 | A1 * | 1/2008 | Jacobs et al. | 710/62 |
| 2008/0059641 | A1 * | 3/2008 | Hernandez et al. | 709/229 |
| 2008/0082712 | A1 * | 4/2008 | Joo | 710/260 |
| 2010/0121820 | A1 * | 5/2010 | Thapa | 707/641 |

FOREIGN PATENT DOCUMENTS

| | | |
|---|---|---|
| JP | 2000-099414 | 4/2000 |
| JP | 2006-252097 | 9/2006 |
| KR | 2000-10174 | 2/2000 |
| KR | 2006-36129 | 4/2006 |

* cited by examiner

*Primary Examiner* — Thomas Lee
*Assistant Examiner* — Jaweed A Abbaszadeh
(74) *Attorney, Agent, or Firm* — Jefferson IP Law, LLP

(57) ABSTRACT

An apparatus for informing a user about a setting state of a Wake-on-LAN (WOL) function includes a WOL-setting determining module to determine a setting state of a WOL function of an information-processing device, and a WOL-setting display module to inform a user of the information-processing device about the setting state of the WOL function during a shutdown of a system of the information-processing device.

18 Claims, 7 Drawing Sheets

| SLEEPING MODE | SETTING STATE OF WOL |
|---|---|
| Standby Mode (S3) | Supported |
| Hibernation Mode (S4) | Supported |
| Shutdown Mode (S5) | Not Supported |

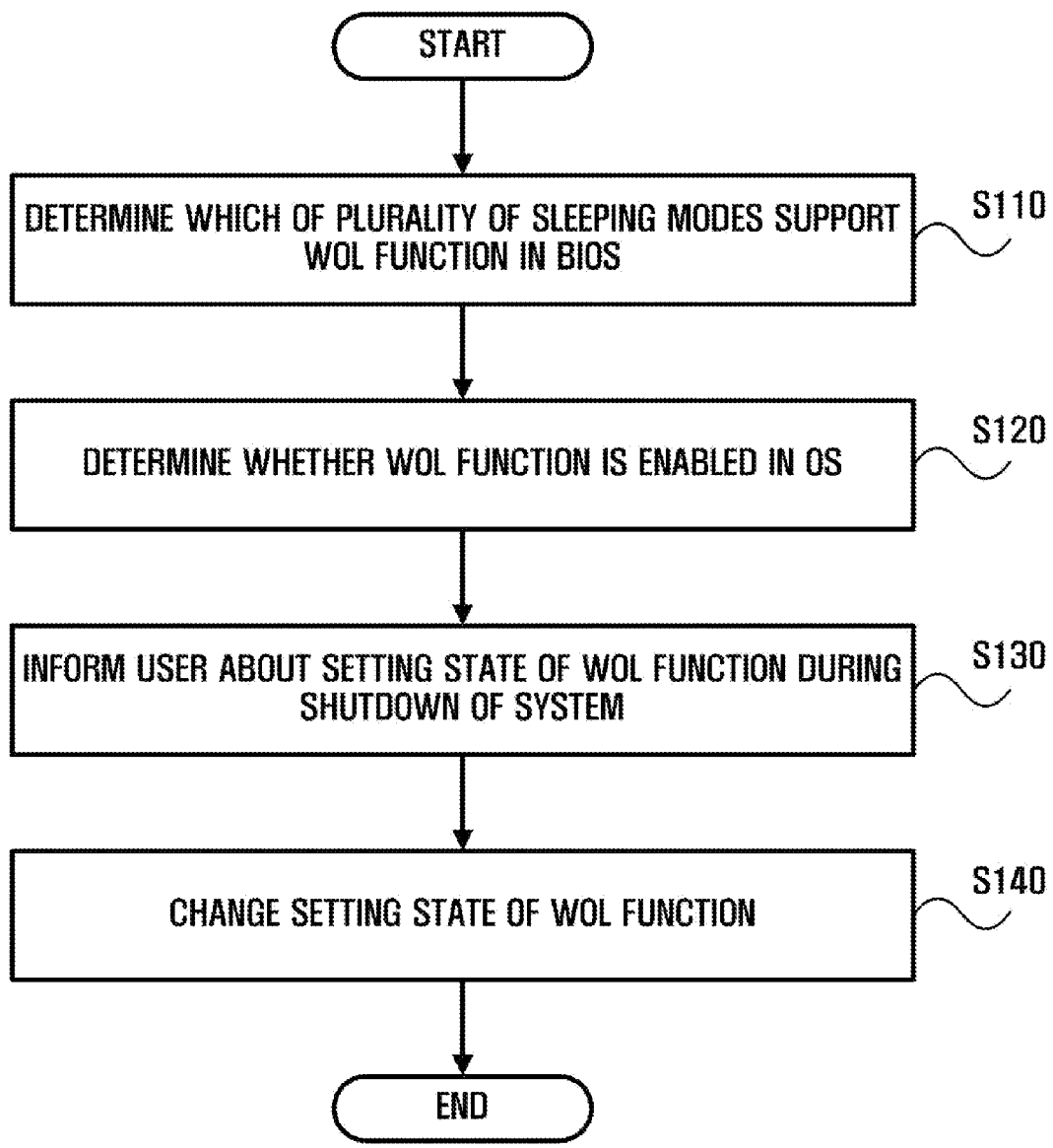

METHOD OF AND APPARATUS FOR INFORMING USER ABOUT SETTING STATE OF WAKE-ON-LAN FUNCTION

CROSS-REFERENCE TO RELATED APPLICATION

This application claims the benefit of Korean Patent Application No. 2007-74735 filed on Jul. 25, 2007, in the Korean Intellectual Property Office, the disclosure of which is incorporated herein by reference in its entirety.

BACKGROUND OF THE INVENTION

1. Field of the Invention

Aspects of the invention relate to remote booting of an information-processing device, and more particularly to a method of and an apparatus for informing a user of an information-processing device about the setting state of a Wake-on-LAN (WOL) function that can remotely boot and operate a system of the information-processing device, and enable the user to change the setting of the WOL function.

2. Description of the Related Art

Desktop computers and mobile computers typically have a Wake-on-LAN (WOL) function. The WOL function enables a network administrator to remotely boot a computer or switch a computer from a power-saving mode to a normal mode. If the network administrator can remotely boot computers on a network and carry out desired tasks on the remote computers using one computer at his or her location, there is no need for the network administrator to visit each computer on the network. The WOL function is executed by transmitting a wake-up frame or packet, also known as a magic frame or packet, from a server, on which a remote management application has been installed, on a network to each client computer on the network that is to be remotely controlled. When a network card in each client computer receives the wake-up frame or packet, the client computer is started. Therefore, to implement the WOL function, a network card that supports the WOL function must be installed in a client computer, which must have a main board that supports the WOL function, in addition to installing the remote management application on the server.

The WOL function described above may be enabled or disabled according to settings in a basic input/output system (BIOS) and an operating system (OS) of a client computer that is to be remotely controlled. A process of enabling the WOL function in the OS will now be described with reference to FIG. 1.

FIG. 1 shows a process of enabling the WOL function according to the related art. It will be assumed that, in the BIOS, the WOL function is enabled in a standby mode and a hibernation mode among a plurality of sleeping modes, but is not enabled in a shutdown mode.

To enable the WOL function in the OS, a device manager window 10 is opened. Then, a window 20 for setting properties of a LAN card network adapter is opened. In this example, it is assumed that the OS of a client computer is Microsoft Windows®. Next, a power management tab in the window 20 for setting the properties of the LAN card is clicked, and an item "Allow this device to bring the computer out of standby" is checked. To shut down the system of the client computer, a standby mode or a hibernation mode is selected in a shutdown window 30. Accordingly, the system of the client computer is shut down with the WOL function being enabled, thereby enabling the system of the client computer to wake up later in response to a wake-up frame or packet transmitted from a server having a remote management application.

However, when shutting down the system of the client computer, a user of the client computer cannot easily determine whether the WOL function is enabled or disabled in the client computer. Therefore, the following problems may occur.

First, if the client computer is left unused for a long time while the WOL function is enabled, there may be a security problem in that a third party can break into the client computer and execute tasks and obtain data without authorization.

Second, if the client computer is left unused for a long time while the WOL function is enabled, even though it is in one of the sleeping modes (such as "hibernation mode" or "standby mode") that support the WOL function, the power consumption may still be high since the memory or hard disk of the client computer is turned on during the sleeping mode. If the client computer is a portable laptop computer, this may cause a drain on the battery and shorten the battery life between charges.

Third, since the user may not be aware that the WOL function is enabled, the client computer may suddenly turn on at times that are undesirable to the user, or may periodically turn on.

Fourth, it may be necessary for the user to frequently determine whether the WOL function is enabled or disabled, and enable the WOL function only when necessary to prevent the above problems. However, this process of frequently determining whether the WOL function is enabled or disabled is a cumbersome task.

SUMMARY OF THE INVENTION

Aspects of the invention relate to a method of and an apparatus for informing a user about a setting state of a Wake-on-LAN (WOL) function to enable a user of an information-processing device to easily determine whether the WOL function is enabled in the information-processing device.

Aspects of the invention also relate to a method of and an apparatus for informing a user about a setting state of a WOL function that are capable of reducing the power consumption of a portable computer and preventing unauthorized access of information by a remote user.

According to an aspect of the invention, an apparatus for informing a user about a setting state of a WOL function includes a WOL-setting determining module to determine a setting state of the WOL function of an information-processing device; and a WOL-setting display module to inform a user of the information-processing device about the setting state of the WOL function during a shutdown of a system of the information-processing device.

According to an aspect of the invention, the apparatus may further include a WOL-setting modification module to change the setting state of the WOL function.

According to an aspect of the invention, a method of informing a user about a setting state of a Wake-on-LAN (WOL) function includes determining a setting state of a WOL function of an information-processing device; and informing a user of the information-processing device about the setting state of the WOL function during a shutdown of a system of the information-processing device.

According to an aspect of the invention, the method may further include changing the setting state of the WOL function.

Additional aspects and/or advantages of the invention will be set forth in part in the description that follows and, in part, will be obvious from the description, or may be learned by practice of the invention.

BRIEF DESCRIPTION OF THE DRAWINGS

The above and/or other aspects and advantages of the invention will become apparent and more readily appreciated from the following description of embodiments of the invention, taken in conjunction with the accompanying drawings of which:

FIG. 6 is a flowchart of a method of informing the user about the setting state of the WOL function according to an aspect of the invention.

DETAILED DESCRIPTION OF THE EMBODIMENTS

Figure 1:
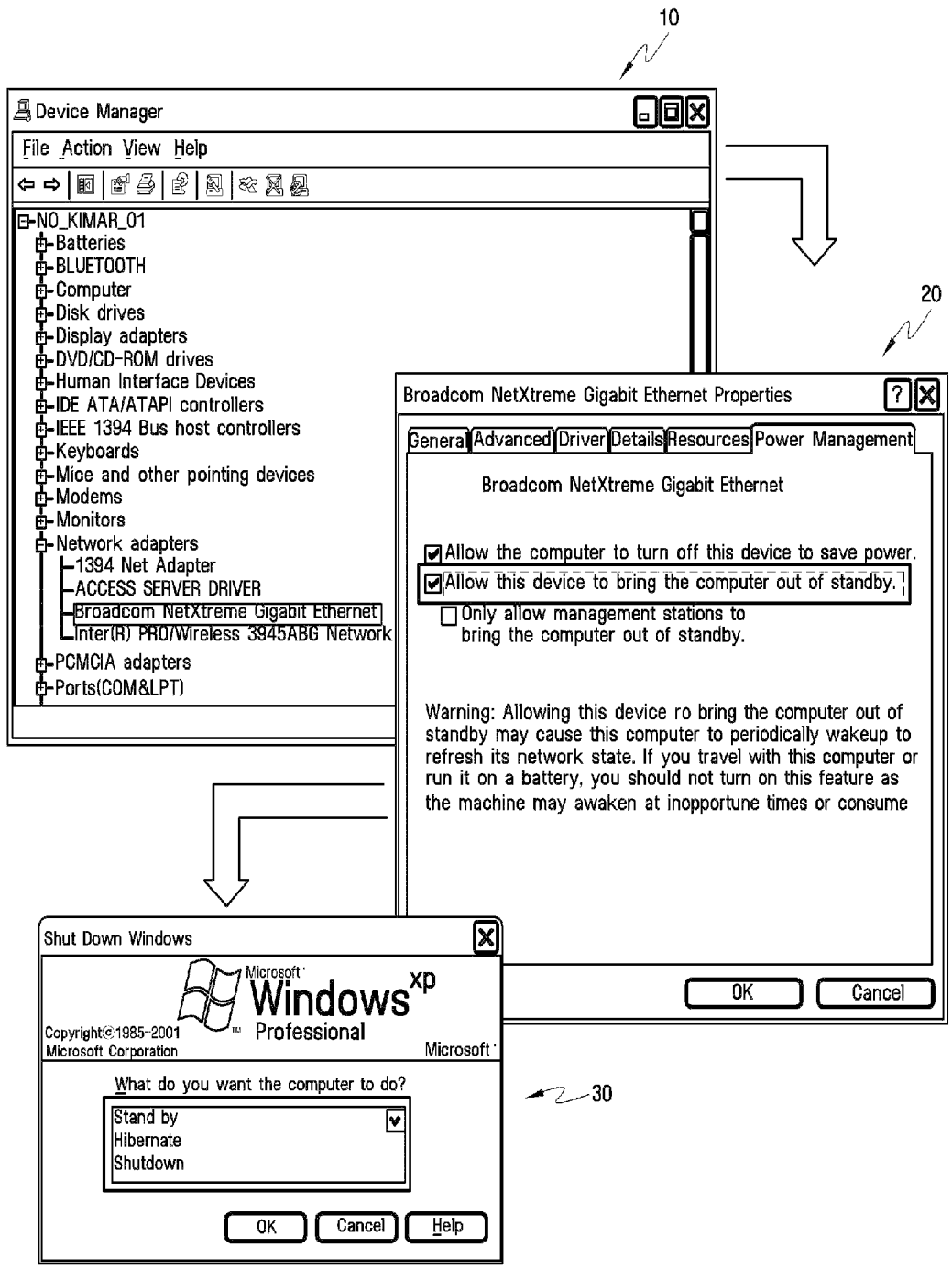
FIG. 1 shows a process of enabling a Wake-on-LAN (WOL) function according to the related art.

Reference will now be made in detail to embodiments of the invention, examples of which are shown in the accompanying drawings, wherein like reference numerals refer to like elements throughout. The embodiments are described below in order to explain the invention by referring to the figures.

A method of and an apparatus for informing a user about a setting state of a predefined Wake-on-LAN (WOL) function according to aspects of the invention will now be described in detail with reference to the drawings.

Figure 2:
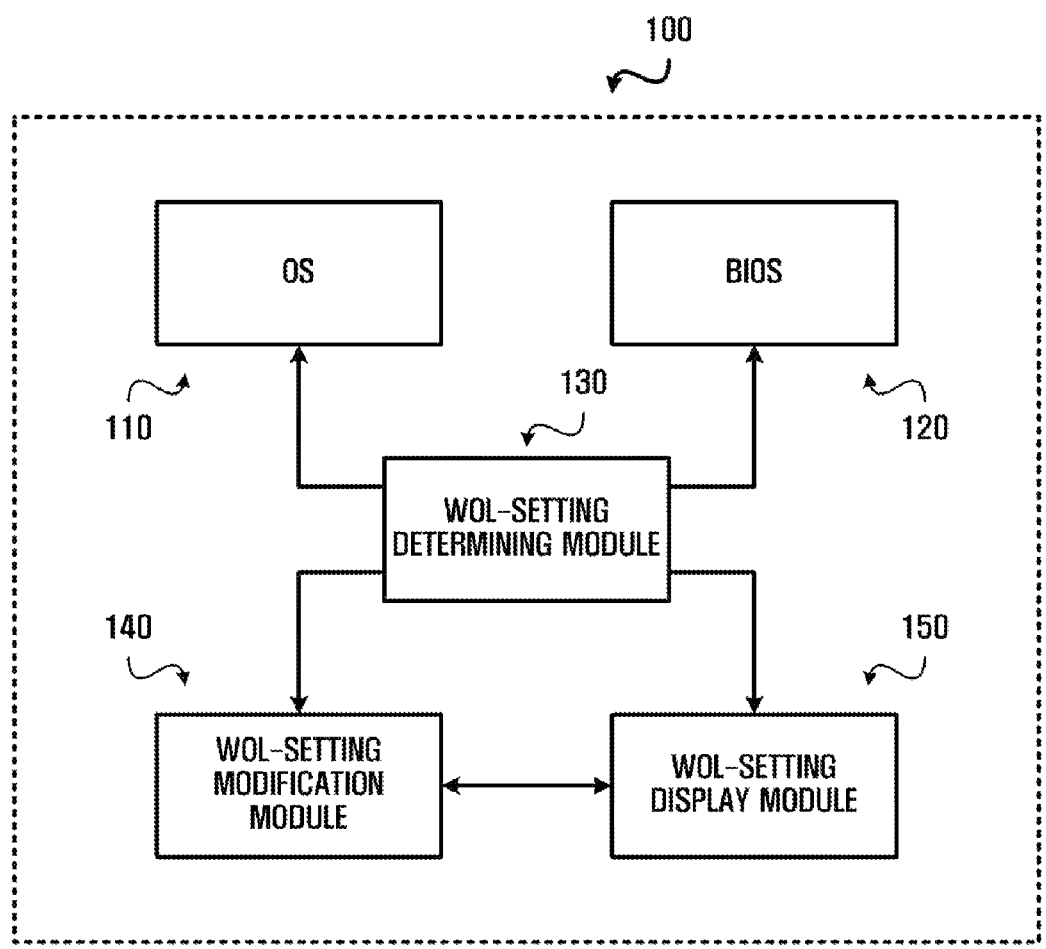
FIG. 2 is a block diagram of an apparatus for informing a user about a setting state of the WOL function according to an aspect of the invention.

FIG. 2 is a block diagram of an apparatus 100 for informing a user about a setting state of the WOL function according to an aspect of the invention. Referring to FIG. 2, the apparatus 100 includes an operating system (OS) 110, a basic input/output system (BIOS) 120, a WOL-setting determining module 130, a WOL-setting modification module 140, and a WOL-setting display module 150.

The OS 110 is system software that operates the computer and manages operating programs after its kernel is loaded into a main memory unit when a computer to be remotely controlled is started. According to an aspect of the invention, a user can enable or disable the WOL function using the OS 110, as will be described with reference to FIG. 3.

Figure 3:
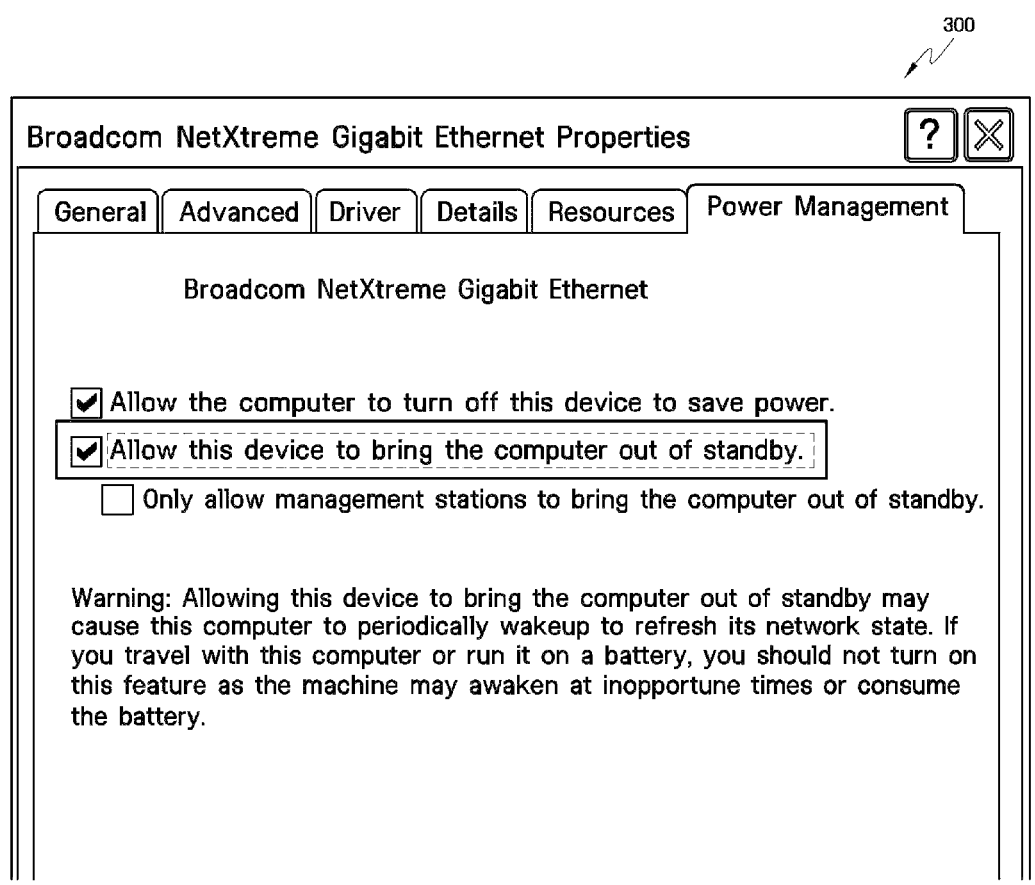
FIG. 3 shows a window for setting the WOL function in an operating system (OS) according to an aspect of the invention.

FIG. 3 shows a window for setting the WOL function in the OS 110 according to an aspect of the invention. First, a device manager window (not shown) is opened, and a window 300 for setting properties of a network adapter is opened. Then, a power management tab on the window 300 is clicked, and an item "Allow this device to bring the computer out of standby" is checked. Accordingly, the OS 110 provides an environment that can support the WOL function of a LAN card. The WOL-setting determining module 130, which will be described later, may check the OS 110 to see whether the WOL function is enabled. Alternatively, the OS 110 may actively provide information regarding whether the WOL function is enabled to the WOL-setting determining module 130.

For convenience of explanation, it is assumed that the OS 110 of the computer is Microsoft Windows®. However, aspects of the invention are not limited to the use of Microsoft Windows®, and may be applied to all operating systems that support the WOL function.

Referring to FIG. 2, the BIOS 120 is a program that performs basic processing functions, such as controlling and manipulating communications between a computer and its peripheral devices, manages inputs and outputs by relaying hardware and software, and controls all workflow of the computer from when the computer is turned on to when it is turned off. The WOL-setting determining module 130, which will be described later, may check the BIOS 120 to determine which of a plurality of sleeping modes support the WOL function. Alternatively, the BIOS 120 may actively provide information regarding which of the sleeping modes support the WOL function to the WOL-setting determining module 130. A setting table showing a state of the WOL function set by the BIOS 120 for each sleeping mode will now be described with reference to FIG. 4.

Figures 4, 5A:
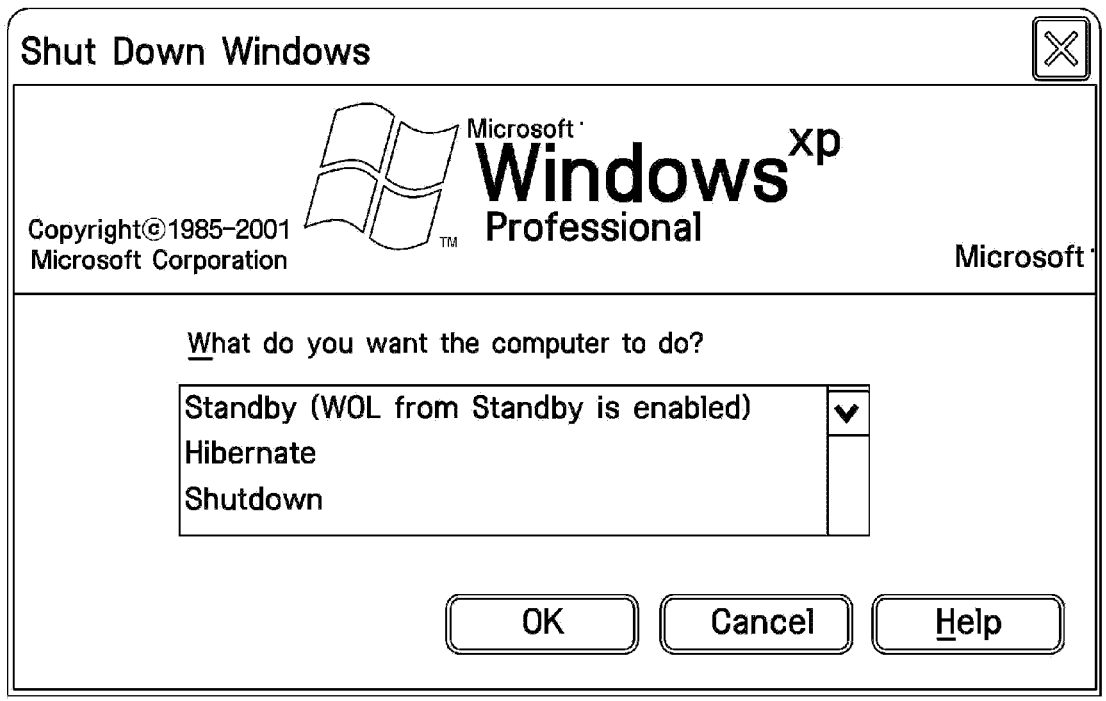
FIG. 4 shows a setting table of the WOL function in a basic input/output system (BIOS) according to an aspect of the invention.
FIGS. 5A through 5D show shutdown windows displaying the setting state of the WOL function according to an aspects of the invention.
Figure 5B:
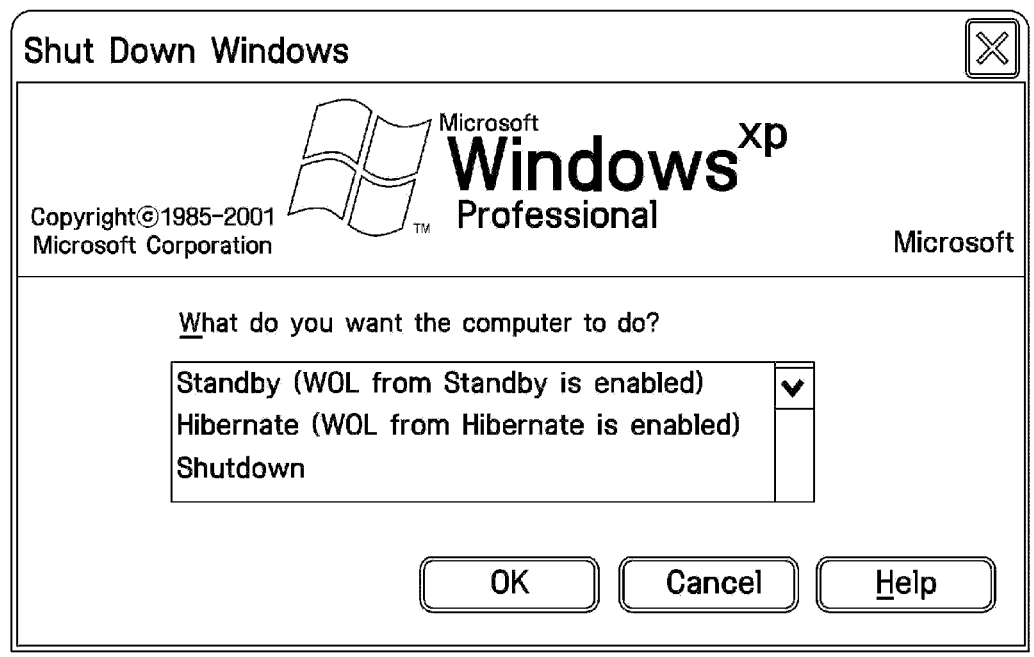
Figure 5C:
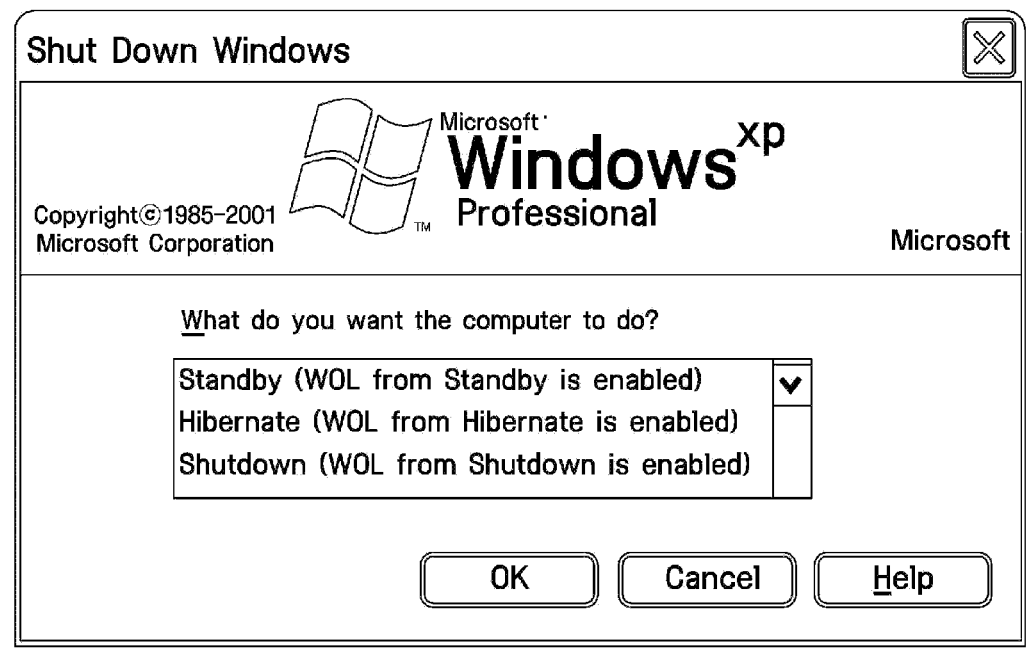
Figure 5D:
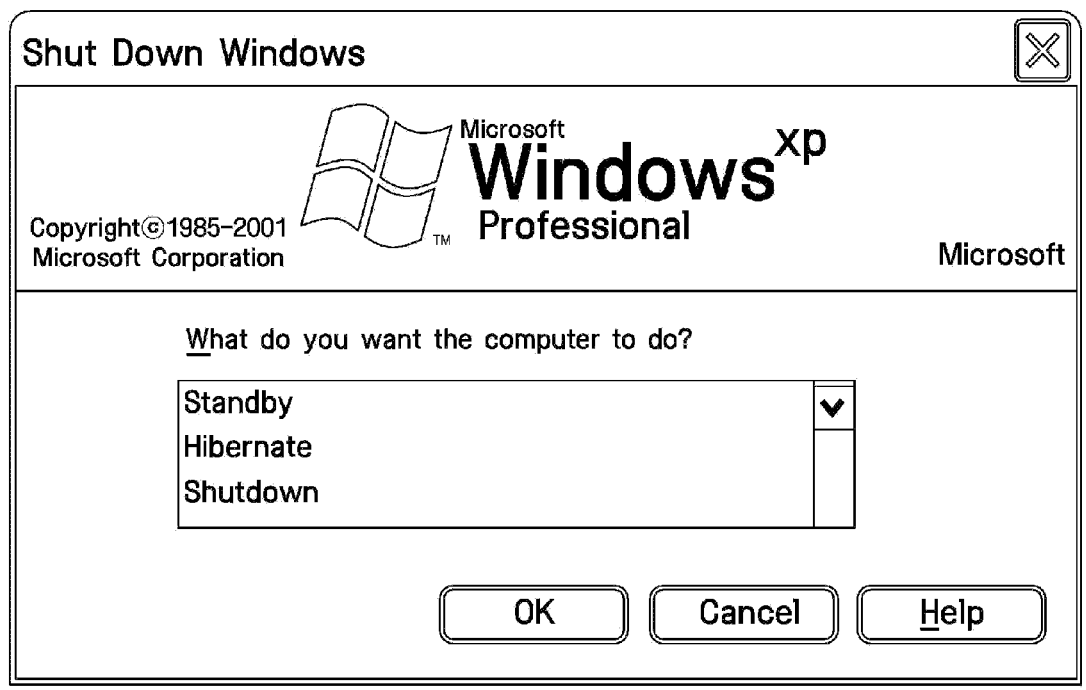

FIG. 4 shows a setting table of the WOL function according to an aspect of the invention. The left column of the setting table shows types of sleeping modes, and the right column of the setting table shows setting states of the WOL function.

Recently, a power management function called an Advanced Configuration and Power Interface (ACPI), which manages power of a computer system, has come into widespread use. According to ACPI, a power management state of a computer is broadly classified into six sleeping modes S0 through S5.

In S0, power is on. S1 is a power-on-suspend (POS) mode in which only a monitor of a computer is turned off. Since power is supplied to all hardware in a main body of the computer in S1, S1 can return to the normal mode the fastest. Although S2 is almost the same as S1, cache memory information is not preserved in S2. S3 is a suspend-to-ram (STR) mode in which power is supplied only to a main power source and a memory. Generally, S3 denotes a standby mode. S4 is a suspend-to-disk (STD) mode in which all information stored in a memory is recorded on a disk and all power is cut off. S4 generally denotes a hibernation mode. S5 is a low power mode in which the computer can be booted only remotely or using a keyboard. Generally, S5 denotes a software shutdown mode. A power supply unit of a computer with the above power management function supports an Advanced Technology Extended (ATX) form factor having a power supply that provides main power, and standby power that is always on whenever power is being supplied to the power supply, even when the main power is off.

According to the setting table of FIG. 4, the WOL function is supported in the standby mode S3 and the hibernation mode S4, but is not supported in the shutdown mode S5. S0 through S2 are generally not used, and thus are not shown in the setting table of FIG. 4. However, the setting state of the WOL function for S0 through S2 may also be defined when necessary. In addition, the setting state of the WOL function shown in the setting table of FIG. 4 may be defined differently according to a setting of a computer that is to be controlled. For example, the WOL function may be supported only in the standby mode. Alternatively, the WOL function may be supported in all of the standby mode, the hibernation mode, and the shutdown mode.

Referring back to FIG. 2, the WOL-setting determining module 130 determines the setting state of the WOL function of an information-processing device as described above. That is, the WOL-setting determining module 130 determines which of a plurality of sleeping modes support the WOL function in the BIOS 120, and determines whether the WOL function is enabled in the OS 110. In this case, the sleeping modes may include all of the S0 through S5 sleeping modes of the ACPI power management mode function. However, according to an aspect of the invention, the sleeping modes may include only the standby mode S3, the hibernation mode S4, and the shutdown mode S5.

Aspects of the invention are applicable to any information-processing device that supports the WOL function, such as a notebook computer, a desktop computer, a mobile computer, a laptop computer, or a palm computer.

The WOL-setting display module 150 informs a user of the information-processing device about the setting state of the WOL function during shutdown of a system of the information-processing device, as will now be described with reference to FIGS. 5A through 5D.

FIGS. 5A through 5D show shutdown windows displaying the setting state of the WOL function according to aspects of the invention. During a shutdown of a system of a computer, a shutdown window is displayed on a computer screen. Therefore, a user can determine which of a plurality of sleeping modes support the WOL function by viewing the shutdown window displayed on the computer screen. According to the shutdown window of FIG. 5A, the WOL function is enabled only in the standby mode (S3). According to the shutdown window of FIG. 5B, the WOL function is enabled only in the standby mode (S3) and the hibernation mode (S4). According to the shutdown window of FIG. 5C, the WOL function is enabled in all of the standby mode (S3), the hibernation mode (S4), and the shutdown mode (S5). According to the shutdown window of FIG. 5D, the WOL is not enabled in any mode.

The WOL-setting modification module 140 enables the user to change the setting state of the WOL function. The WOL-setting modification module 140 may enable the user to select a combination of modes that support the WOL function using the BIOS 120. That is, the WOL-setting modification module 140 may enable the user to select a case where the WOL function is supported only in the standby mode (S3), or a case where the WOL function is supported only in the standby mode (S3) and the hibernation mode (S4), or a case where the WOL function is supported only in the standby mode (S3), the hibernation mode (S4), and the shutdown mode (S5), or a case where the WOL function is supported in all modes. Also, the WOL-setting modification module 140 may enable the user to disable the WOL function if it is currently enabled, or enable the WOL function if it is currently disabled, using the OS 110 of the information-processing device.

The term "module" as used herein refers, for example, to a software or hardware component, such as a Field Programmable Gate Array (FPGA) or Application Specific Integrated Circuit (ASIC), that performs certain tasks. A module may advantageously be configured to reside in an addressable storage medium and to execute on one or more processors. Thus, a module may include, by way of example, components, such as software components, object-oriented software components, class components, and task components, processes, functions, attributes, procedures, subroutines, program code segments, drivers, firmware, microcode, circuitry, data, databases, data structures, tables, arrays, and variables. The functionality provided for in the components and modules described herein may be combined into fewer components and modules, or may be divided into additional components and modules.

FIG. 6 is a flowchart of a method of informing a user of a setting state of the WOL function according to an aspect of the invention.

Referring to FIG. 6, the WOL-setting determining module 130 determines which of a plurality of sleeping modes support the WOL function from the BIOS 120 of the information-processing device (operation S110), and determines whether the WOL function is enabled in the OS 110 of the information-processing device (operation S120).

The WOL-setting display module 150 informs a user of the information-processing device about a setting state of the WOL function during a shutdown of a system of the information-processing device by providing the user with information regarding which of the sleeping modes support the WOL function by displaying the information in a shutdown window (operation S130). Therefore, the user can always determine which of the sleeping modes support the WOL function by viewing the shutdown window. After determining the setting state of the WOL function, the user may change the setting state of the WOL function (operation S140). That is, as described above, the user may change which of the sleeping modes support the WOL function in the BIOS 120. Also, the user may disable the WOL function if it is currently enabled, or enable the WOL function if it is currently disabled, in the OS 110.

It is understood that operations S130 and 140 described above can also be performed in reverse order. It is also understood that a computer-readable medium may be encoded with processing instructions for implementing a method of informing a user about a setting state of the WOL function according to aspects of the invention performed by a computer.

As described above, aspects of the invention may provide at least the following advantages.

First, a user of an information-processing device can easily determine whether the WOL function is enabled in the information-processing device. In addition, power consumption of the information-processing device can be reduced while unauthorized access of information by a remote user can be prevented.

However, the advantages provided by aspects of the invention are not limited to those set forth herein, and other advantages of the invention will be obvious from the description, or may be learned by practice of the invention.

Although several embodiments of the invention have been shown and described, it would be appreciated by those skilled in the art that various changes may be made in these embodiments without departing from the principles and spirit of the invention, the scope of which is defined in the claims and their equivalents.

What is claimed is:

1. An apparatus for informing a user about a setting state of a Wake-on-LAN (WOL) function, the apparatus comprising:
  a WOL-setting determining module to determine which of a plurality of sleeping modes support a WOL function of a Basic Input/Output System (BIOS) of an information-processing device, and to determine whether the WOL function is enabled in an Operating System (OS) of the information-processing device; and
  a WOL-setting display module to inform a user of the information-processing device which of the plurality of sleeping modes support the WOL function if the WOL function is enabled during a shutdown of a system of the information-processing device.

2. The apparatus of claim 1, wherein the sleeping modes comprise a standby mode, a hibernation mode, and a shutdown mode.

3. The apparatus of claim 1, wherein the WOL-setting display module provides the user with information regarding which of a plurality of sleeping modes support the WOL function by displaying the information in a shutdown window of the information-processing device.

4. The apparatus of claim 3, wherein the sleeping modes comprise a standby mode, a hibernation mode, and a shutdown mode.

5. The apparatus of claim 1, further comprising a WOL-setting modification module to change the setting state of the WOL function.

6. The apparatus of claim 5, wherein the WOL-setting modification module selects at least one sleeping mode that supports the WOL function from a plurality of sleeping modes in a basic input/output system (BIOS) of the information-processing device.

7. The apparatus of claim 6, wherein the sleeping modes comprise a standby mode, a hibernation mode, and a shutdown mode, and the WOL-setting modification module selects a case where the WOL function is supported only in the standby mode, or a case where the WOL function is supported only in the hibernation mode, or a case where the WOL function is supported only in the standby mode and the hibernation mode, or a case where the WOL function is supported only in the standby mode, the hibernation mode, and the shutdown mode, or a case where the WOL function is not supported in any of the sleeping modes.

8. The apparatus of claim 6, wherein the WOL-setting modification module determines whether the WOL function can be enabled in an operating system (OS) of the information-processing device.

9. The apparatus of claim 1, wherein the information-processing device comprises a notebook computer, a laptop computer, a desktop computer, a mobile computer, or a palm computer.

10. A method of informing a user about a setting state of a Wake-on-LAN (WOL) function, comprising:
   determining which of a plurality of sleeping modes support a WOL function in a Basic Input/Output System (BIOS) of an information-processing device,
   determining whether the WOL function is enabled in an Operating System (OS) of the information-processing device; and
   informing a user of the information-processing device which of the plurality of sleeping modes support the WOL function if the WOL function is enabled during a shutdown of a system of the information-processing device.

11. The method of claim 10, wherein the sleeping modes comprise a standby mode, a hibernation mode, and a shutdown mode.

12. The method of claim 10, wherein the informing of the user about the setting state of the WOL function comprises providing the user with information regarding which of a plurality of sleeping modes support the WOL function by displaying the information in a shutdown window of the information-processing device.

13. The method of claim 12, wherein the sleeping modes comprise a standby mode, a hibernation mode, and a shutdown mode.

14. The method of claim 10, further comprising changing the setting state of the WOL function.

15. The method of claim 14, wherein the changing of the setting state comprises selecting at least one sleeping mode that supports the WOL function from a plurality of sleeping modes in a basic input/output system (BIOS) of the information-processing device.

16. The method of claim 15, wherein the sleeping modes comprise a standby mode, a hibernation mode, and a shutdown mode, and the selecting the of at least one sleeping mode comprises selecting a case where the WOL function is supported only in the standby mode, or a case where the WOL function is supported only in the hibernation mode, or a case where the WOL function is supported only in the standby mode and the hibernation mode, or a case where the WOL function is supported only in the standby mode, the hibernation mode, and the shutdown mode, or a case where the WOL function is not supported in any of the sleeping modes.

17. The method of claim 14, wherein the changing of the setting state further comprises determining whether the WOL function can be enabled in an operating system (OS) of the information-processing device.

18. A non-transitory computer-readable medium encoded with processing instructions for implementing a method of informing a user about a setting state of a Wake-on-LAN (WOL) function performed by a computer, the method comprising:
   determining which of a plurality of sleeping modes support a WOL function in a Basic Input/Output System (BIOS) of an information-processing device,
   determining whether the WOL function is enabled in an Operating System (OS) of the information-processing device; and
   informing a user of the information-processing device which of the plurality of sleeping modes support the WOL function if the WOL function is enabled during a shutdown of a system of the information-processing device.

* * * * *